United States Patent
Laskowski et al.

(10) Patent No.: US 12,176,564 B2
(45) Date of Patent: Dec. 24, 2024

(54) FASTENING OF CRASH PARTS ON BATTERY CASINGS

(71) Applicant: Kautex Textron Gmbh & Co. KG, Bonn (DE)

(72) Inventors: Christine Laskowski, Royal Oak, MI (US); Utsav Panchamia, Troy, MI (US); Georg Enkirch, Salz (DE); Havya Premkumar, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 18/036,075

(22) PCT Filed: Nov. 9, 2021

(86) PCT No.: PCT/EP2021/081148
§ 371 (c)(1),
(2) Date: May 9, 2023

(87) PCT Pub. No.: WO2022/101221
PCT Pub. Date: May 19, 2022

(65) Prior Publication Data
US 2023/0327259 A1    Oct. 12, 2023

(30) Foreign Application Priority Data
Nov. 11, 2020  (DE) .......................... 102020129786.6

(51) Int. Cl.
*H01M 50/242*    (2021.01)
*B60L 50/64*    (2019.01)
(Continued)

(52) U.S. Cl.
CPC ........... *H01M 50/242* (2021.01); *B60L 50/64* (2019.02); *H01M 50/121* (2021.01);
(Continued)

(58) Field of Classification Search
CPC ...................................................... B60L 50/64
See application file for complete search history.

(56) References Cited

U.S. PATENT DOCUMENTS

2010/0136402 A1* 6/2010 Hermann ............ H01M 50/224
429/185
2011/0143179 A1  6/2011 Nakamori
(Continued)

FOREIGN PATENT DOCUMENTS

DE    102012213308 A1    9/2013
DE    102019209956 A1    11/2020
(Continued)

OTHER PUBLICATIONS

International Preliminary Report on Patentability, in PCT/EP2021/081148, mailed Oct. 13, 2022.
(Continued)

*Primary Examiner* — Maria Laios
(74) *Attorney, Agent, or Firm* — Occhiuti & Rohlicek LLP

(57) ABSTRACT

A battery casing system for a traction battery in a motor vehicle, said battery casing system comprising a battery casing having a plastic battery casing shell which at least partially defines a battery casing volume for accommodating at least one battery component. The battery casing system of the invention is characterized in that same includes at least one reinforcing means which can be connected to an outer face of the battery casing shell and which is formed separately from the battery casing shell. The invention further relates to a traction battery comprising a battery casing system as well as to a motor vehicle comprising a traction battery.

11 Claims, 2 Drawing Sheets

Figure 1:
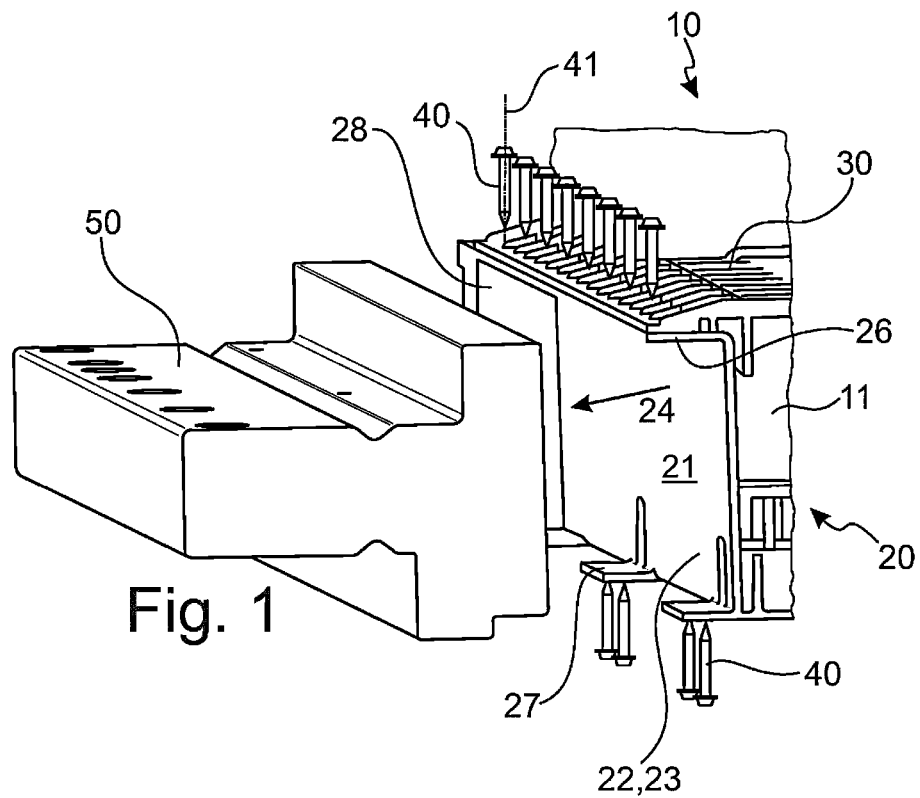

(51) Int. Cl.
*H01M 50/121* (2021.01)
*H01M 50/224* (2021.01)
*H01M 50/249* (2021.01)
*H01M 50/262* (2021.01)

(52) U.S. Cl.
CPC ....... *H01M 50/224* (2021.01); *H01M 50/249* (2021.01); *H01M 50/262* (2021.01); *H01M 2220/20* (2013.01)

(56) References Cited

U.S. PATENT DOCUMENTS

| | | | | |
|---|---|---|---|---|
| 2013/0248263 | A1* | 9/2013 | Umetani | B60L 50/64 180/65.1 |
| 2013/0252059 | A1* | 9/2013 | Choi | H01M 50/24 156/60 |
| 2017/0346052 | A1* | 11/2017 | Weber | H01M 50/242 |

FOREIGN PATENT DOCUMENTS

| | | | |
|---|---|---|---|
| EP | 2332761 | A1 | 6/2011 |
| EP | 3528316 | A1 | 8/2019 |

OTHER PUBLICATIONS

International Search Report, PCT Application No. PCT/EP2021/081148, mailed Feb. 14, 2022 (3 pages).

\* cited by examiner

FASTENING OF CRASH PARTS ON BATTERY CASINGS

This patent application is a 371 national stage of International Application No. PCT/EP2021/081148, filed Nov. 9, 2021, which claims the benefit of the filing date the priority of German patent application no. 10 2020 129 786.6, filed on Nov. 11, 2020, the contents of which are hereby incorporated by reference in their entireties.

The present invention relates to a battery casing system for a traction battery of an electrically drivable motor vehicle. Furthermore, the present invention relates to a traction battery of an electrically drivable motor vehicle and, moreover, to an electrically drivable motor vehicle having a traction battery.

Traction batteries of electric vehicles, which have battery casings made of metal, are known from the prior art. An electric vehicle is understood to mean an electrically drivable vehicle, in particular an electrically drivable motor vehicle. In these battery casings known from the prior art, reinforcing means formed on the outer face, which are designed, for example, in the form of struts, can be provided for increasing the stiffness and for increasing the safety of the battery casing against accidents, which struts are welded to the battery casing, so that the reinforcing means are an integral component of the battery casing.

In the correspondingly designed battery casings, the body, which provides structure and has reinforcement functions, is simultaneously the sealing capsule of the battery casing, so that the structural connections formed as weld seams must also be designed to be fluid-tight between a reinforcing means and the battery casing in addition to their connection function and must remain fluid-tight even in the event of an accident.

The object of the present invention is to provide an improved battery casing system which is simpler to manufacture and further has improved stability, in particular in the event of an accident.

The object of the present invention is achieved by a battery casing system having the features of claim 1. Advantageous embodiments of the battery casing system are described in the claims dependent on claim 1.

More precisely, the object of the present invention is achieved by a battery casing system for a traction battery of a motor vehicle, said battery casing system comprising a battery casing having a plastic battery casing shell which at least partially defines a battery casing volume for accommodating at least one battery component. The battery casing system according to the invention is characterized in that it has at least one reinforcing means which can be connected to an outer face of the battery casing shell and is formed separately from the battery casing shell.

The battery casing system according to the invention has improved stability, in particular in the event of an accident. This is because if stress is placed on the battery casing system, for example in the event of an accident of an electric vehicle in which the battery casing system according to the invention is installed, forces exerted on the reinforcing means are introduced uniformly and over a large area into the battery casing shell, so that the battery casing shell is protected in an improved manner against structural damage. Therefore, the battery casing of the battery casing system according to the invention has improved leak tightness.

For example, in the event of a side impact, large stresses of the traction battery and thus of the battery casing occur. Without provision of reinforcing means, the battery casing of the traction battery would withstand only minimal stresses before the structural integrity would give way and the battery casing would leak. By providing the at least one separately formed reinforcing means, the reinforcing means can absorb energy and be deformed. Furthermore, the stresses are distributed uniformly over a larger area of the battery casing shell by means of the reinforcing means, so that the battery casing shell has a lower stress per unit area.

Furthermore, the battery casing system according to the invention is simpler and thus more economical to produce. This is because, based on the separate formation of the reinforcing means, the structure of the battery casing shell can be simpler and have a simpler geometry.

The feature according to which the reinforcing means is formed separately from the battery casing shell means that the battery casing shell and the reinforcing means are present as separate components prior to manufacture or assembly of the battery casing system. The battery casing shell and the at least one reinforcing means are connected to one another only after manufacture and assembly of the battery casing system.

The at least one reinforcing means is preferably screwed to the battery casing shell. Further preferably, the at least one reinforcing means is riveted to the battery casing shell. Further preferably, the at least one reinforcing means is clipped to the battery casing shell. Further preferably, the at least one reinforcing means is welded to the battery casing shell. Further preferably, the at least one reinforcing means is glued to the battery casing shell.

The outer face of the battery casing shell on which the reinforcing means can be fastened is preferably a side face of the battery casing shell. The side face of the battery casing shell is a side which, in the installed state of the battery casing system in an electric vehicle, runs substantially parallel to a side face of the electric vehicle, i.e., not parallel to the front or to the rear of the electric vehicle.

The battery casing shell preferably has a thermoplastic material. Further preferably, the battery casing shell has polyamide. Further preferably, the battery casing shell is fiber-reinforced. Further preferably, the battery casing shell is fiber-reinforced by means of glass fibers and/or carbon fibers.

It is also possible for the battery casing shell to have a thermosetting plastic or be formed from a thermosetting plastic. The battery casing shell having a thermosetting plastic is preferably fiber-reinforced, glass fibers and/or carbon fibers preferably being used for the fiber reinforcement.

The at least one reinforcing means preferably has one or more reinforcing struts and/or reinforcing walls, which can be designed, for example, as inner struts or as inner walls. The reinforcing struts or reinforcing walls are further preferably connected to one another at least in sections. A correspondingly designed reinforcing means has increased stability, in particular in the event of an accident.

The battery casing system is preferably designed such that the at least one reinforcing means has metal.

A correspondingly designed battery casing system has an even higher level of stability. Furthermore, the reinforcing means can be used as a grounding path of a traction battery.

The metal of the reinforcing means is further preferably at least partially coated with a plastic. Further preferably, the plastic of the coating of the reinforcing means is compatible with the plastic of the battery casing shell in terms of welding.

The reinforcing means preferably has steel. A battery casing system with a correspondingly designed reinforcing means has great stability. Further preferably, the reinforcing means is formed from steel.

Further preferably, the reinforcing means has aluminum. A battery casing system comprising a correspondingly designed reinforcing means is inexpensive to produce and furthermore has sufficient stability, in particular in the event of an accident. Further preferably, the reinforcing means is formed from aluminum.

The battery casing system is preferably designed such that the at least one reinforcing means has a composite material.

The correspondingly designed battery casing system has increased stability with simultaneously low weight. Furthermore, the correspondingly designed battery casing system has the advantage that, depending on the material selection for the battery casing shell and for the matrix material of the reinforcing means, the reinforcing means can be welded to the battery casing shell.

The reinforcing means is preferably formed from the composite material.

Preferably, the composite material, which can also be referred to as a compound material, is a fiber-reinforced plastic. Further preferably, the fiber-reinforced plastic has a matrix material made of a thermoplastic material. For example, the thermoplastic plastic is polyamide. Further preferably, the fiber-reinforced plastic has glass fibers and/or carbon fibers. Further preferably, the fiber-reinforced plastic is produced by means of pultrusion.

According to a further embodiment, the reinforcing means comprising a composite material has metal and plastic. The regions made of metal are preferably connected in a positive-locking manner to the regions of the reinforcing means formed from plastic.

The battery casing system is preferably designed such that the battery casing has at least two reinforcing means which can be fastened to two outer faces of the battery casing shell.

Preferably, the two reinforcing means are fastened to two opposing outer faces of the battery casing shell.

Further preferably, the at least two reinforcing means can be fastened or are fastened to two side surfaces of the battery casing shell. Consequently, a traction battery of a motor vehicle having a correspondingly designed battery casing has a significantly increased stability in the event of a side crash.

Further preferably, the battery casing has three or four reinforcing means which can be fastened or are fastened to different outer faces of the battery casing shell. Preferably, at least one reinforcing means can be fastened or is fastened to each outer face of the battery casing shell, so that the battery casing has at least one reinforcing means on all sides.

The battery casing system is preferably designed such that the at least one reinforcing means can be screwed to the battery casing shell.

The correspondingly designed battery casing system requires a low assembly effort. Furthermore, in the event of damage to the reinforcing means, the reinforcing means can be removed particularly easily and replaced with a new reinforcing means.

The at least one reinforcing means is preferably connected to the battery casing shell by means of a direct screw connection. A direct screw connection is to be understood as a screw connection of the reinforcing means to the battery casing shell in which at least the battery casing shell has no drill holes for the connecting screws introduced into the battery casing shell before the reinforcing means is connected to the battery casing shell. Consequently, the battery casing shell is perforated only during connection to the at least one reinforcing means by screwing in the connecting screws. A correspondingly designed battery casing has increased stability, because the battery casing shell is not weakened by boreholes.

In the assembled state of the battery casing system, the at least one reinforcing means is screwed to the battery casing shell.

The battery casing system is preferably designed such that the at least one reinforcing means can be connected to the battery casing shell by means of a plurality of connecting screws, wherein, when the battery casing system is in the assembled state, the respective longitudinal axes of the respective connecting screws run perpendicular to a surface normal of a contact surface of the outer face of the battery casing shell on which the reinforcing means rests.

The correspondingly designed battery casing has improved operational reliability, particularly in the event of an accident. This is because, due to the arrangement of the connecting screws with respect to the contact surface of the outer face of the battery casing shell on which the reinforcing means rests, the risk of penetration of the battery casing container wall by one of the connecting screws is considerably reduced.

A further advantage of the correspondingly designed battery casing is its simple assembly, because the connecting screws are easily accessible due to the arrangement of the connecting screws with respect to the battery casing shell.

The battery casing system is preferably designed such that the battery casing shell has at least one projection which extends in the direction away from the battery casing volume, the projection transitioning into a side wall of the battery casing shell, and the at least one reinforcing means having an outer contour which corresponds to the outer contour of the battery casing shell defined by the projection and the side wall.

The correspondingly designed battery casing has an even higher level of stability. Furthermore, the correspondingly designed battery casing has a further reduced assembly effort, because the positioning of the reinforcing means is made possible in a simplified manner due to the outer contour of the battery casing shell defined by the projection and the side wall.

The projection preferably transitions directly into the side wall of the battery casing shell.

The reinforcing means preferably rests against the outer contour formed by the projection and the side wall without leaving gaps. The reinforcing means therefore rests against the battery casing shell in a positive-locking manner.

The outer contour of the reinforcing means can also be referred to as an application contour.

The projection with the side wall of the battery casing shell preferably forms an angle between 45° and 135°.

Further preferably, the battery casing system is designed such that the at least one projection is designed as a sealing flange of the battery casing shell.

The correspondingly designed battery casing has an even higher level of stability. Furthermore, the correspondingly designed battery casing has a simplified design, because the sealing flange serves to seal the battery casing for connection to a battery casing cover and/or to a further battery casing shell and to fasten the at least one reinforcing means.

Further preferably, the battery casing system is designed in such a way that the at least one reinforcing means can be connected to the battery casing shell by means of at least one positive-locking connection device which projects through the sealing flange.

The positive-locking connection device is preferably designed as a connecting screw. Further preferably, the positive-locking connection device is designed as a connecting rivet. Further preferably, the positive-locking connection device is designed as a latching device.

Further preferably, the battery casing system has a casing cover which can be fastened to the sealing flange for closing the battery casing shell, a seal being arranged between the sealing flange and the casing cover in the assembled state of the battery casing system, and the seal being arranged between the battery casing volume and the at least one positive-locking connection device in the assembled state of the battery casing system.

The correspondingly designed battery casing has an improved leak tightness.

The feature according to which the seal is arranged between the battery casing volume and the at least one positive-locking connection device is to be understood such that, in a plan view of an upper side of the battery casing or in a cross-sectional view of the battery casing that cuts through the seal, the seal is arranged between the battery casing volume, which can also be referred to as a battery casing accommodation space, and the positive-locking connection device.

Further preferably, the battery casing system is designed in such a way that the battery casing shell has, in addition to the at least one first projection, at least one second projection, the first projection and the second projection each extending in the direction away from the battery casing volume, the first projection and the second projection each transitioning into the side wall of the battery casing shell, the first projection and the second projection being arranged opposite one another and the at least one reinforcing means having an outer contour which corresponds to the outer contour of the battery casing shell defined by the first projection, the side wall and the second projection.

The correspondingly designed battery casing has an even higher level of stability. Furthermore, the correspondingly designed battery casing has a further reduced assembly effort, because the positioning of the reinforcing means is made possible in a simplified manner because of the outer contour of the battery casing shell defined by the projections and the side wall.

The projections preferably transition directly into the side wall of the battery casing shell.

The reinforcing means preferably rests against the outer contour formed by the projections and the side wall without leaving gaps. The reinforcing means therefore rests against the battery casing shell in a positive-locking manner.

The outer contour of the reinforcing means can also be referred to as an application contour.

Preferably, the respective projections form an angle with the side wall of the battery casing shell between 45° and 135°.

Preferably, the first projection, the second projection and the side wall are arranged relative to one another in such a way that they are arranged in a C-shape relative to one another in a side view on the battery casing shell.

Further preferably, the battery casing shell has, on at least one of its outer faces—each of which forms a contact surface for a reinforcing means— a circumferentially formed projection, so that, in the assembled state of the battery casing system, the reinforcing means is enclosed by the circumferential projection on four sides.

The present invention is further based on the object of providing an improved traction battery, which has reduced assembly complexity, improved stability and reduced weight.

This object of the present invention is achieved by a traction battery having the features of claim 10. More precisely, this object of the present invention is achieved by a traction battery for a motor vehicle, the traction battery having a battery casing system as described above and at least one battery component, which is arranged in the battery casing shell.

The battery component is, for example, a battery module, a cooling module, a fluid line or the like. According to the invention, there are no restrictions in this regard.

Furthermore, the object of the present invention is to provide an improved electrically drivable motor vehicle. This object of the present invention is achieved by a motor vehicle having the features of claim 11.

Figure 2:
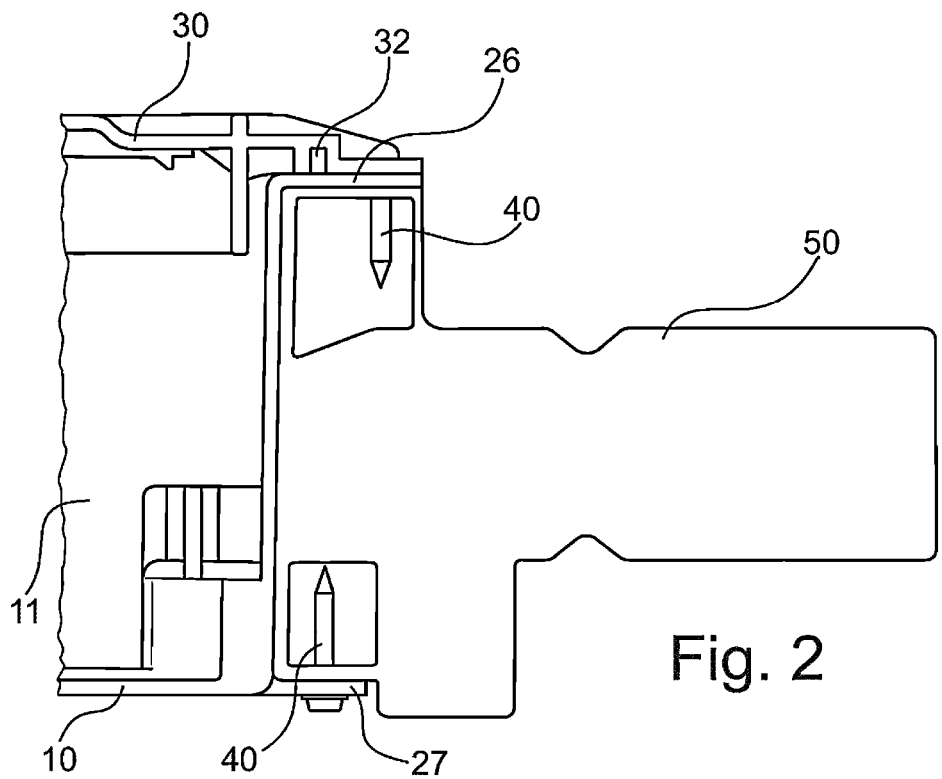
Figure 3:
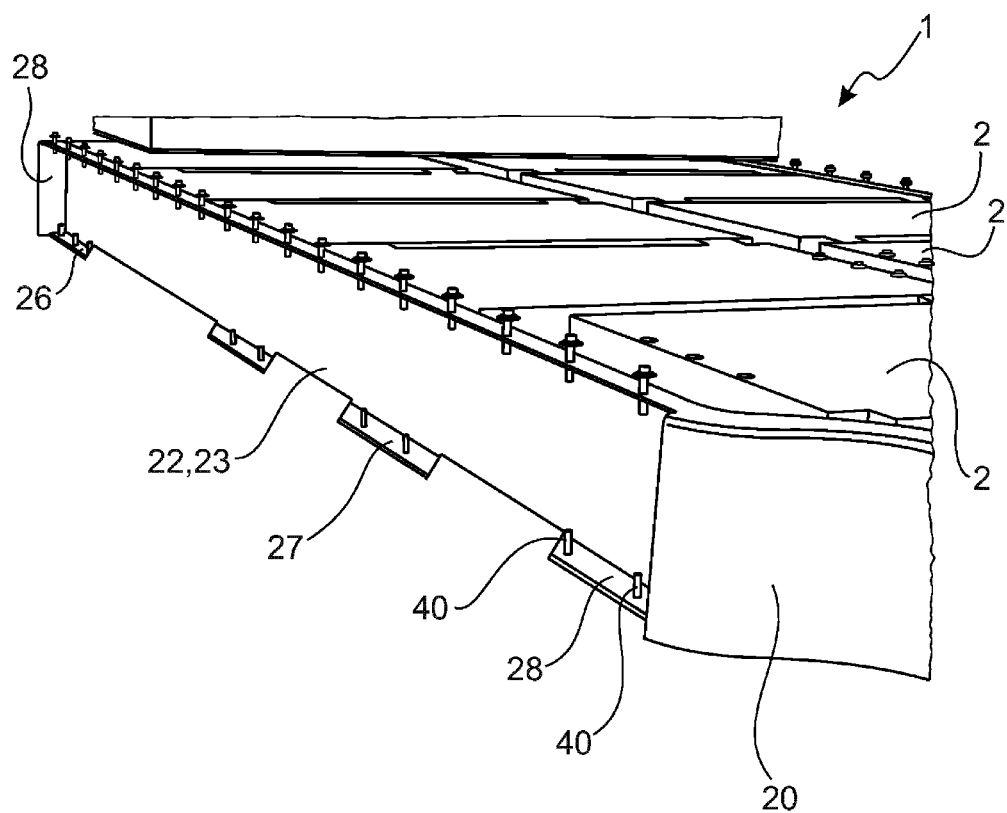

Further advantages, details and features of the invention can be found below in the described embodiments. In the drawings, in detail:

FIG. 1: is a perspective sectional view of a battery casing system according to the invention in the disassembled state;

FIG. 2: is a sectional view of the battery casing system according to the invention in the assembled state; and FIG. 3: is a perspective view of a battery casing shell of the battery casing system shown in FIGS. 1 and 2 with the cover removed.

In the following description, the same reference signs denote the same components or features, such that a description of a component with reference to a drawing also applies to the other drawings. This avoids repeating the description. Furthermore, individual features that have been described in connection with one embodiment can also be used separately in other embodiments.

FIG. 1 shows a perspective sectional view of a battery casing system according to the invention in the disassembled state. FIG. 2 shows the battery casing system in an assembled state, FIG. 2 also showing the battery casing system in section. It can be seen that the battery casing system has a battery casing 10, which in turn has a battery casing shell 20 and a casing cover 30 that can be connected to the battery casing shell 20, the battery casing cover being connected to the battery casing shell 20 via a plurality of connecting screws 40 in the exemplary embodiment illustrated in FIGS. 1 and 2. The battery casing shell 20 partially delimits a battery casing volume 11, which is designed to accommodate one or more battery components 2.

FIG. 3 shows a perspective view of a traction battery 1 which comprises the battery casing system shown in FIGS. 1 and 2. The casing cover 30 here is removed and not shown in FIG. 3, so that the battery casing volume 11, which can also be referred to as the battery casing accommodation space 11, is visible. In the exemplary embodiment shown, the battery components 2 are each designed as battery modules 2. However, the present invention is not limited to a corresponding design of the battery components 2. Thus, for example, cooling modules and brackets can also be designed as battery components, to name only two examples.

The battery casing system has at least one reinforcing means 50 that can be connected to an outer face 22 of the battery casing shell 20. In FIG. 1, the reinforcing means 50 is shown in the disassembled state of the battery casing shell 20, whereas in FIG. 2 the battery casing system 20 is shown in the assembled state, in which the reinforcing means 50 is fastened to the battery casing shell 20.

In the exemplary embodiment shown, the reinforcing means 50 is designed as an impact protection device 50 and attached to the outer face 22 of the battery casing shell 20, which in the installed state of the motor vehicle runs parallel to a side line of the motor vehicle. Thus, the provision of the reinforcing means 50 increases the stability of the battery casing shell 20 and thus of the battery casing 10. In particular in the event of a side impact of the motor vehicle in which the battery casing system shown in the figures is installed, the battery casing 10 is significantly reinforced by the provision of the reinforcing means 50.

The reinforcing means 50 can have a plurality of connecting walls internally, which are arranged correspondingly in a manner adapted to the conditions and, if necessary, are connected to one another in order to adapt the stability of the reinforcing means 50 accordingly to the given circumstances.

The reinforcing means 50 can be formed, for example, from a metal or comprise metal. In particular steel and/or aluminum are suitable as metal. It is also possible for the reinforcing means 50 to have a composite material or be produced from a composite material.

Furthermore, it is possible, although not shown in the figures, that the battery casing system has a plurality of reinforcing means 50 which are arranged on different sides of the battery casing shell 20. For example, the battery casing system can have two reinforcing means 50, which are each arranged on opposite outer faces 22 from each other of the battery casing shell 20, as a result of which the battery casing system is reinforced in particular in the event of side impact accidents.

The battery casing shell 20 has a first projection 26 and at least one second projection 27, both the first projection 26 and the second projection 27 extending away from the battery casing volume 11. Both the first projection 26 and the second projection 27 each transition into a side wall 21 of the battery casing shell 20. The first projection 26 and the second projection 27 are arranged opposite one another. Thus, in a sectional view of the battery casing shell 20, the outer face 22 of the battery casing shell 20 is C-shaped.

Furthermore, the battery casing shell 20 has two further projections 28 in the form of third projections 28, which can be seen in particular from FIG. 3. In an assembled state of the battery casing system, the third projections 28 run in the vertical direction. The third projections 28 connect each first projection 26 to at least one second projection 27.

It can be seen from FIGS. 1 and 2 that the reinforcing means 50 has an outer contour which corresponds to the outer contour of the battery casing shell 30, which is defined by the first projection 26, the side wall 21, the second projection 27 and the third projections 28. Thus, the reinforcing means 50 fits into the shape of the battery casing shell 20.

The first projection 26 of the battery casing shell 20 is designed as a sealing flange 26 of the battery casing shell 20. The reinforcing means 50 is connected to the battery casing shell 20 in that a plurality of connecting screws are screwed through the sealing flange 26 and project into the reinforcing means 50. In the illustrated exemplary embodiment, the casing cover 30 is also connected to the battery casing shell 20, more precisely to the sealing flange 26 of the battery casing 20 by means of the plurality of connecting screws 40, so that in the assembled state the sealing flange 26 is sandwiched between the casing cover 30 and the reinforcing means 50.

As can be seen from FIG. 2, a seal 32 is arranged between the projection 26 and the casing cover 30, said seal 32 being arranged between the battery casing volume 11 and the connecting screws 40 when the battery casing system is in the assembled state.

In the exemplary embodiment shown, the connecting screws 40 project perpendicularly through the sealing flange 26. This means that the reinforcing means 50 can be connected to the battery casing shell 20 by means of the plurality of connecting screws, the respective longitudinal axes 41 of the respective connecting screws 40 running perpendicular to a surface normal 24 of a contact surface 23 of the outer face 22 of the battery casing shell 20, against which the reinforcing means 50 rests or was applied when the battery casing system is in the assembled state.

In the exemplary embodiment shown, the reinforcing means 50 is further connected to the battery casing shell 20 by means of the second projection 27. The reinforcing means 50 is connected to the battery casing shell 20 by a plurality of connecting screws 40 being screwed into the reinforcing means 50 while projecting through the second projection 27.

LIST OF REFERENCE SIGNS 1 traction battery
2 battery component, battery module
10 battery casing
11 battery casing volume/battery casing accommodation space
20 battery casing shell
21 side wall (of the battery casing shell)
22 outer face (of the battery casing shell)
23 contact surface (of the outer face)
24 surface normal (of the contact surface)
26 (first) projection/sealing flange (of the battery casing shell)
27 second projection
28 third projection
30 casing cover (of the battery casing)
32 seal
40 positive-locking connection device/connecting screw
41 longitudinal axis (of the connecting screw)
50 reinforcing means/reinforcing element/impact protection device

The invention claimed is:

1. A battery casing system for a traction battery of a motor vehicle, said battery casing system having the following features:
the battery casing system comprises a battery casing having a plastic battery casing shell;
the battery casing shell at least partially delimits a battery casing volume for accommodating at least one battery component,
the battery casing system comprises at least one reinforcing means which can be connected to an outer face of the battery casing shell and is formed separately from the battery casing shell;
the battery casing shell has at least one projection which extends in the direction away from the battery casing volume; and
the at least one projection transitions into a side wall of the battery casing shell, wherein the battery casing system is characterized by the following feature:
the at least one reinforcing means has an outer contour which corresponds to the outer contour of the battery casing shell defined by the at least one projection and the side wall, wherein the at least one projection comprises at least one first projection and at least one second projection, the battery casing shell has the at least one second projection, the at least one first projection and the at least one second projection extending in each case in the direction away from the battery casing volume;

the at least one first projection and the at least one second projection each transition into the side wall of the battery casing shell, the at least one first projection and the at least one second projection being arranged opposite one another;

the at least one reinforcing means has an outer contour which corresponds to the outer contour of the battery casing shell defined by the at least one first projection, the side wall and the at least one second projection.

2. The battery casing system according to claim 1, wherein the at least one reinforcing means comprises metal.

3. The battery casing system according to claim 1, wherein the at least one reinforcing means comprises a composite material.

4. The battery casing system according to claim 1, wherein the battery casing comprises at least two reinforcing means which can be fastened to two outer faces of the battery casing shell.

5. The battery casing system according to claim 1, wherein the at least one reinforcing means can be screwed to the battery casing shell.

6. The battery casing system according to claim 5, wherein the at least one reinforcing means can be connected to the battery casing shell by means of a plurality of connecting screws, the respective longitudinal axes of the respective connecting screws running perpendicular to a surface normal of a contact surface of the outer face of the battery casing shell, against which the reinforcing means rests, when the battery casing system is in the assembled state.

7. The battery casing system according to claim 1, wherein the at least one projection is designed as a sealing flange of the battery casing shell.

8. The battery casing system according to claim 1, wherein the at least one reinforcing means can be connected to the battery casing shell by means of at least one positive-locking connection device which projects through the at least one projection.

9. The battery casing system according to claim 8, characterized by the following features:

the battery casing system has a casing cover which can be fastened to the projection for closing the battery casing shell;

in the assembled state of the battery casing system, a seal is arranged between the projection and the casing cover; and in the assembled state of the battery casing system, the seal is arranged between the battery casing volume and the at least one positive-locking connection device.

10. A traction battery for a motor vehicle, wherein the traction battery comprises a battery casing system according to claim 1 and at least one battery component which is arranged in the battery casing shell.

11. A motor vehicle comprising a traction battery according to claim 10.

* * * * *